April 21, 1936.     E. S. COOK     2,038,164
FLUID PRESSURE BRAKE
Filed June 24, 1933     3 Sheets-Sheet 1
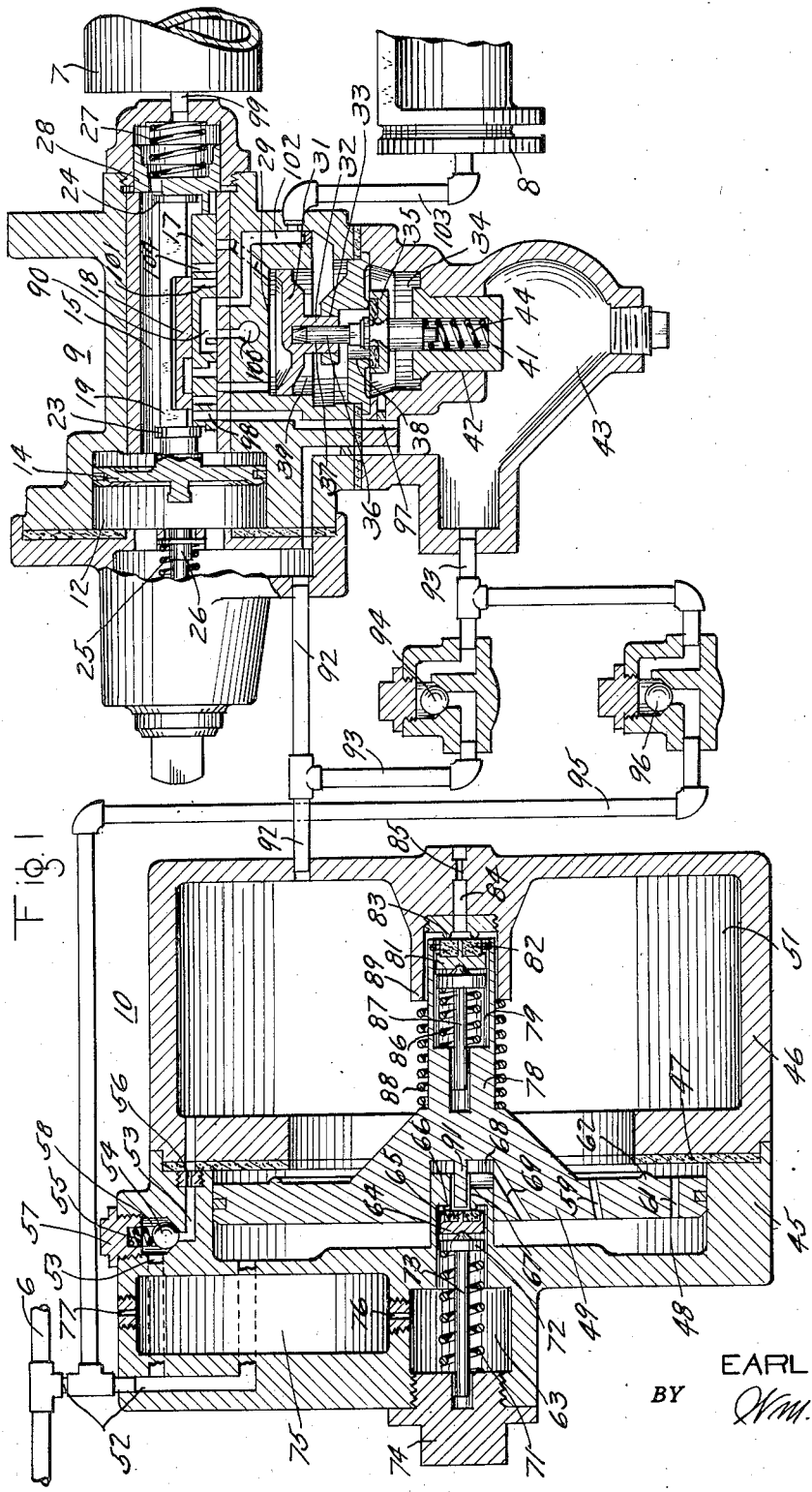
INVENTOR
EARLE S. COOK
BY
*Wm. M. Cady*
ATTORNEY

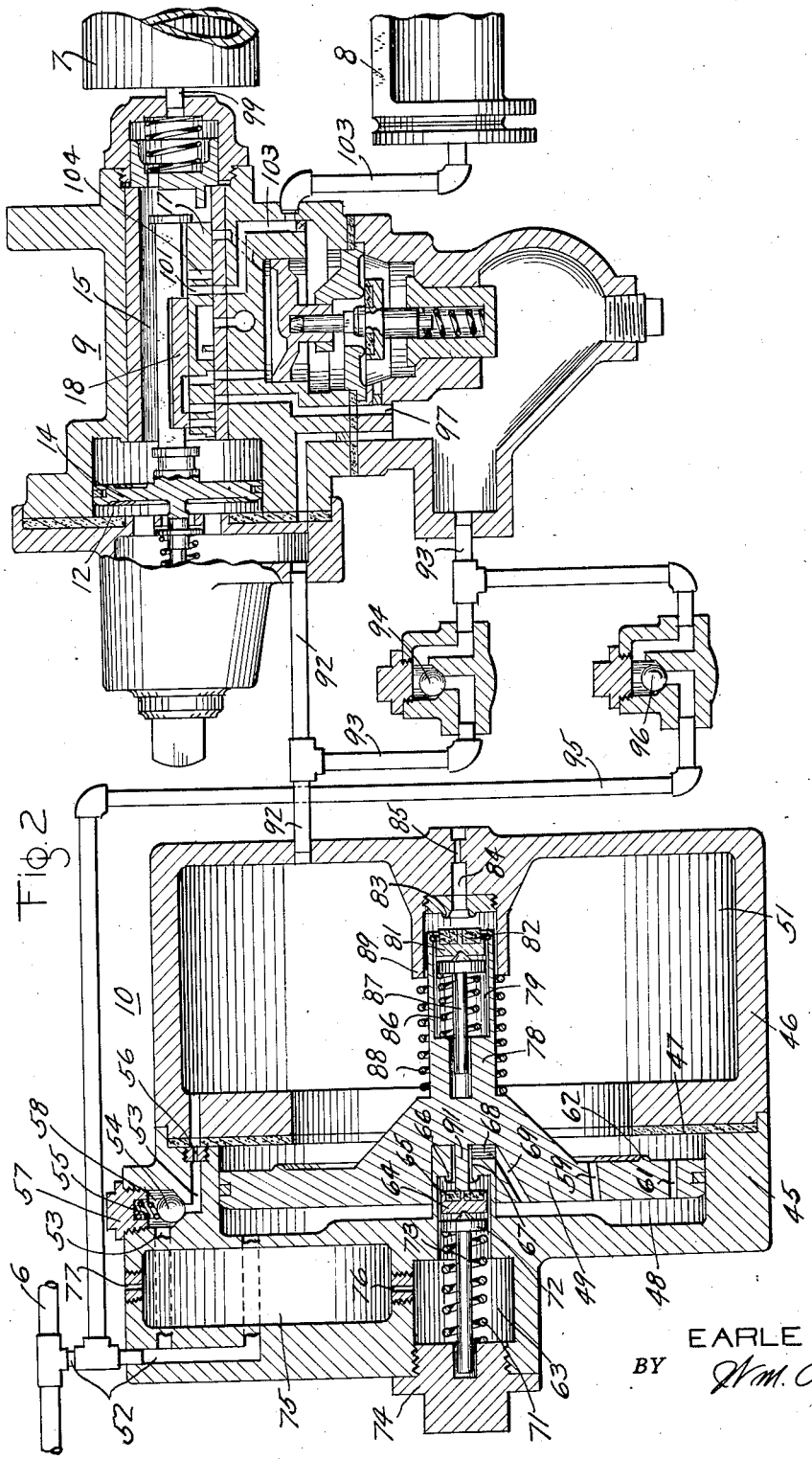

April 21, 1936.　　　　E. S. COOK　　　　2,038,164
FLUID PRESSURE BRAKE
Filed June 24, 1933　　　3 Sheets-Sheet 3
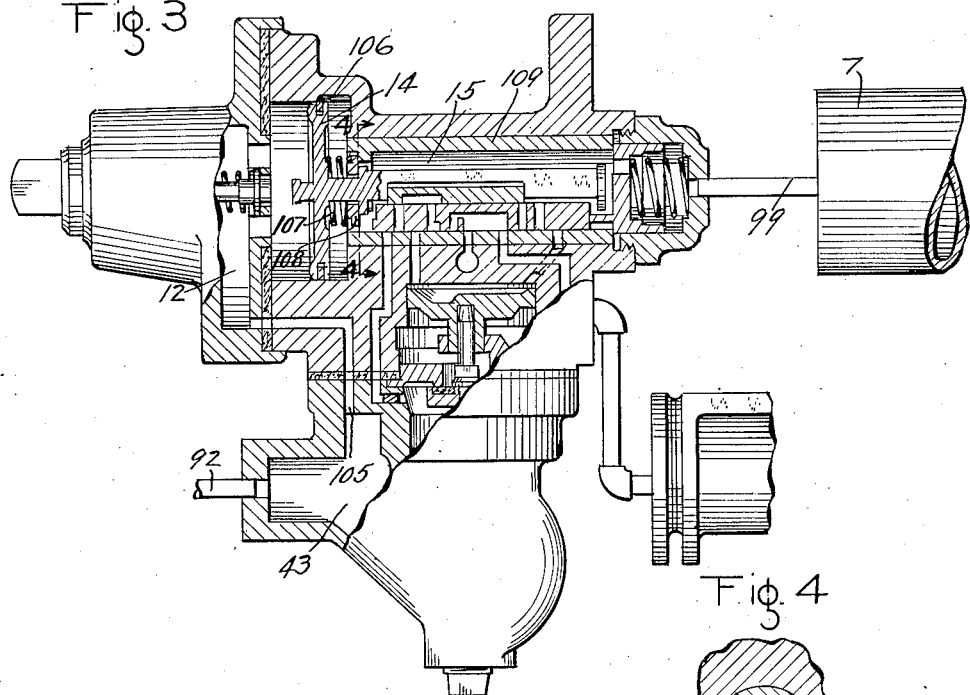
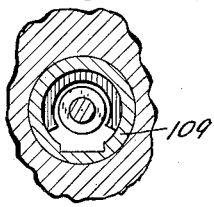
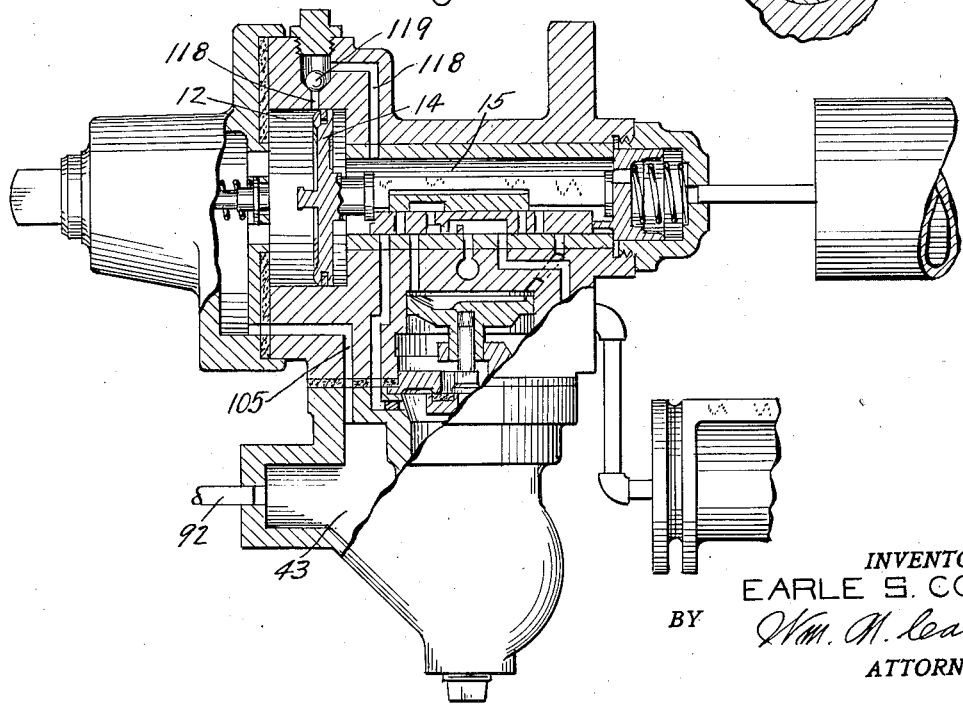
INVENTOR
EARLE S. COOK
BY Wm. W. Cady
ATTORNEY Patented Apr. 21, 1936

2,038,164

UNITED STATES PATENT OFFICE 2,038,164

FLUID PRESSURE BRAKE

Earle S. Cook, Wilkinsburg, Pa., assignor to The Westinghouse Air Brake Company, Wilmerding, Pa., a corporation of Pennsylvania Application June 24, 1933, Serial No. 677,435

9 Claims. (Cl. 303—83)

This invention relates to fluid pressure brakes and particularly to apparatus for controlling the operation of the triple valve devices or other brake controlling valve devices for facilitating the application and release of the brakes on a train of cars.

It is well known that the brake controlling valve devices commonly known as triple valve devices employed for controlling the application and release of the brakes on a train of cars require a definite reduction in brake pipe pressure to overcome the friction of the main slide valves in order to effect movement of the triple valve pistons to positions for effecting service or emergency application of the brakes, and that the rate of brake pipe pressure reduction for effecting a service application of the brakes is limited to a predetermined rate commonly known as a service rate in order to obtain movement of the triple valve pistons to service position and so that said pistons will not move to emergency position when a service application of the brakes is desired. Reduction of brake pipe pressure at a rate faster than service rate or at an emergency rate, causes movement of the triple valve pistons and the slide valves to emergency position, wherein an emergency application of the brakes is effected.

The triple valve device commonly known as the K-triple valve device requires from two to two and one half pounds brake pipe pressure reduction below that in the auxiliary reservoir (which has been charged to brake pipe pressure) in order to overcome inertia and frictional resistance and to effect movement of the triple valve piston to service position, and a greater reduction in brake pipe pressure to overcome the opposing resistance of a stop spring to effect movement of the piston to emergency position, and it has been found that an appreciable time is required to cause said pressure reduction on the rear cars of the train, even though the triple valve is equipped with the commonly employed quick service and quick action valve devices for locally and progressively venting fluid from the brake pipe when the triple valve is moved to service or emergency position.

Consequently, in making a service application of the brakes on a long train, there is an undesirable lapse of time between the application of the brakes on the cars at the head end of the train and the application of the brakes on the cars at the rear end of the train.

This is also true and is particularly undesirable in making an emergency application of the brakes, for in such case, the slack of the train may run in with undue harshness due to the sudden retardation of the cars at the head end of the train as a result of the hard application of the brakes on the front cars of the train before the brakes on the rear cars are applied.

It is an object of this invention to provide an accelerator valve device on each car for use in conjunction with a standard K-triple valve device or any triple or brake controlling valve device not provided with quick service or emergency quick action means and which is more sensitive to fluid pressure variations than the K-triple valve device and which operates upon a relatively slight reduction in brake pipe pressure to effect a local reduction in brake pipe pressure for propagating through the medium of similar sensitive accelerator valve devices on the cars of the train, serial local brake pipe pressure reduction on successive cars throughout the length of the train, and to thereby increase the rate at which the brakes are successively applied on the cars of the train from front to rear.

Another object of the invention is to provide an accelerator valve device having the above noted characteristics, wherein the travel of the fluid pressure sensitive piston for operating the valve for effecting local brake pipe pressure reduction is relatively short so that dampening action due to piston displacement is minimized and does not appreciably interfere with quick service and quick action pressure reduction wave transmission.

A further object of the invention is to provide accelerator valve devices for use in conjunction with triple valve devices, wherein means are provided for permitting the fluid pressure acting on opposite faces of the triple valve pistons to substantially equalize, in the event of an overcharged brake pipe, and thereby prevent an undesired application of the brakes when the brake pipe pressure falls to the lower pressure maintained by the feed valve and when the brake valve, not shown, is moved from charging or release position to running position, and insuring a more consistent response of the triple valve devices to effect an application of the brakes upon a reduction in brake pipe pressure closely following a release operation of the brakes.

A further object of the invention is to provide an accelerator valve device having the above noted characteristics whereby release of the brakes is accelerated from the front to the rear of the train and with more uniform release action.

A further object of the invention is to provide an accelerator valve device for the purposes defined which may be associated with a standard K-triple valve device without necessitating material structural alterations, and which is relatively simple and of inexpensive and rugged construction.

A further object of the invention is to provide an accelerator valve device having the above noted characteristics and which operates on principles somewhat similar to those employed in the fluid pressure brake equipment disclosed in the co-pending application Serial No. 677,436 of Earle S. Cook, the applicant herein, and Ellery R. Fitch, filed concurrently herewith on June 24, 1933, and assigned to the assignee of this application, and wherein modified means are provided for controlling the quick service piston and the pressure of the fluid within the quick service chamber.

These and other objects that will be made apparent throughout the further description of the invention are attained by means of the accelerator valve device hereinafter described and illustrated in the accompanying drawings, wherein Fig. 1 is a sectional view, partially in elevation, of the improved accelerator valve device connected to fluid pressure brake equipment including the triple valve device and showing the parts in release position;

Fig. 2 is a view similar to Fig. 1 showing the parts in service application position;

Fig. 3 is a sectional view, partially in elevation, of a slightly modified triple valve device, and Fig. 4 is a view similar to Fig. 3 showing a further modification of the triple valve device.

Referring to the drawings, the equipment includes a brake pipe 6, an auxiliary reservoir 7, a brake cylinder 8, a triple valve device 9 and an accelerator valve device 10, all of which equipment is carried on each car of a train of cars.

The triple valve device 9 may comprise a casing having a piston chamber 12 containing a piston 14, and having a valve chamber 15 connected to the auxiliary reservoir 7 and containing a main slide valve 17 and an auxiliary or graduating slide valve 18, mounted on and having a movement relative to the main slide valve, said valves being operated by said piston through a piston stem 19. The main slide valve 17 is disposed between a stop shoulder 23 on the stem 19 and a stop flange 24 on the end of the stem, and the shoulders 23 and 24 are so spaced that the stem may be moved within certain limits of movement without effecting movement of the main slide valve 17. The graduating valve 18 is so connected to the stem 19 that it moves with the stem and may lap and uncover ports in the main slide valve, as will hereinafter appear.

A stop spring 25, which yieldingly engages a stop member 26, serves to yieldingly arrest the piston 14 in lap position, wherein the piston just engages the stop member 26 and is adapted to be compressed and permit movement of the piston 14 to service application position or to its extreme left or emergency application position upon reduction of the fluid pressure within the chamber 12 at an emergency rate. A stop spring 27 acting on a stop member 28 serves to yieldingly arrest the piston 14 in normal or full release position (shown in Fig. 1) when the piston is moved to the right from an application position.

The triple valve device shown, being of the well known K type, is provided with means for effecting quick service action and emergency quick action, but when the improved means for securing quick serial service action and emergency quick action is employed, the passages through which quick service and emergency quick action are effected are plugged, so that these features of the K triple valve device are rendered inoperative.

The accelerator valve device 10 may comprise casing sections 45 and 46 that are secured together by means of bolts, not shown, and with a sealing gasket 47 therebetween. A piston chamber 48 is disposed within the casing 45 and contains an accelerator piston 49 having at one side an accelerator chamber 51 formed in the casing 46. The piston chamber 48 is connected to the brake pipe 6 by means of passage and pipe 52, the passage being relatively short and having a flow capacity equal to that of the brake pipe. The accelerator chamber 51 is connected to the brake pipe 6 through a passage 53 containing a choke plug having a restricted passage 56 and containing a ball check valve 54 that is loaded by means of a spring 55. The spring 55 which presses the ball check valve 54 into engagement with its seat, is retained by means of a threaded nut 57, which closes the ball check valve chamber 58. In order to vary the spring pressure applied to the ball, a spring having a different tension value may be substituted.

Communication from the piston chamber 48 to the accelerator chamber 51 is established through ports 59 and 61 in the piston 49, the latter being disposed exteriorly of an annular seat rib 62 on the piston 49, which is adapted to make sealing engagement with the sealing gasket 47 under certain charging conditions.

The casing 45 contains a quick service valve chamber 63 containing a quick service valve 64 having a sealing seat 65 adapted to engage an annular seat rib 66 and normally close a passage 67, which leads to a chamber 68 in the piston 49, which chamber communicates with the piston chamber 48 through a passage 69. The quick service valve 64 is normally seated by a spring 71 in the chamber 63 which is disposed between a collar 72 on an operating stem 73 and a threaded nut 74. The stem 73 pivotally engages the valve 64 and permits relative angular movement of the valve with respect to the stem in order that it may be properly seated.

The casing 45 is also provided with a volume reservoir or bulb 75 which is connected to the chamber 63 through a restricted or choked passage 76 and which communicates with the atmosphere through a choke passage 77.

The quick service piston 49 is provided with a tail piece or guide stem 78 having a bore 79 therein containing a check valve 81 having a sealing seat 82 adapted to engage an annular seat rib 83 and close an atmospheric passage 84 having a restricted passage 85. The check valve construction is similar to the quick service valve construction and the valve is normally yieldingly held in closed position by means of a spring 86, which presses against an operating stem 87 that is pivotally connected to the valve as indicated in Fig. 1.

Movement of the quick service piston 49 toward the right into sealing engagement with the gasket 47 is opposed by a spring 88 surrounding the stem 78 and disposed between the quick service piston 49 and an extension 89 of the casing 46. A stem 91 on the piston 49 is adapted to engage the valve 64 and cause it to open when the piston is moved toward the left. When the pressures on opposite faces of the quick service piston 49 are balanced, the springs 71 and 88 serve to center the piston 49 in the release position shown in Fig. 1. With the quick service piston 49 in release position, the sealing seat rib 62 on the piston is out of engagement with the gasket 47.

The accelerator chamber 51 is connected to the triple valve piston chamber 12 by a pipe 92 and to the dirt cleaner chamber of the triple valve device by means of the pipe 92 and a pipe 93 containing a ball check valve 94, the check valve permitting the flow of fluid under pressure from the accelerator chamber 51 to the dirt cleaner chamber 43 of the triple valve device and preventing a back flow of fluid from the dirt cleaner chamber to the quick service chamber. The dirt cleaner chamber of the triple valve device is connected to the brake pipe 6 through pipes 52 and 95 containing a ball check valve 96, and pipe 93. The ball check valve 96 permits fluid under pressure to flow from the brake pipe to the dirt cleaner chamber of the triple valve device and prevents a back flow of fluid from the accelerator chamber 51 and the dirt cleaner device chamber 43. The purposes of the ball check valve 94 will hereinafter appear.

In operation, when initially charging, the brake valve device, not shown, is placed in release position, in which fluid under pressure is supplied from the main reservoir to the brake pipe in the usual well known manner, and after a certain interval the brake valve device is moved to running position, in which the pressure of the fluid supplied to the brake pipe is governed by the feed valve device, not shown.

Assuming that the parts of the accelerator valve device are in the lap or release position, as shown in Fig. 1, to which position they are moved when the pressure on opposite faces of the accelerator piston are balanced, fluid under pressure flows from the brake pipe to the accelerator chamber 51 through pipe and passage 52, piston chamber 48 and the passages 59 and 61 in the piston 49. With the triple valve parts in the normal release position, as shown in the drawings, wherein the brake cylinder 8 is open to the atmosphere by way of pipe and passage 103, cavity 90 in the main slide valve 17, and atmospheric passage 100, fluid under pressure flows from the accelerator chamber 51 to the triple valve piston chamber 12 through pipe and passage 92.

With the main slide valve 17 of the triple valve device in normal release position, as shown in Figure 1, the auxiliary reservoir 7 is charged with fluid under pressure directly from the brake pipe through pipe 95, past ball check valve 96, through pipe 93, dirt collector chamber 43, passage 97, a port 98 of suitable flow area in the main slide valve 17, valve chamber 15, and pipe 99. Thus chamber 51 and auxiliary reservoir 7 are charged simultaneously in parallel relation from the brake pipe 6.

It is well known that when the brake pipe is charged from the main reservoir at the head end of the train, the brake pipe pressure is higher at the head end of the train than it is at the rear end of the train, and that there is a tendency to overcharge the auxiliary reservoirs at the head end of the train before the auxiliary reservoirs at the rear end of the train are fully charged, and that where no means is provided to prevent rapid charge of the auxiliary reservoirs at the head end of the train, the length of time required to supply sufficient fluid under pressure to the auxiliary reservoirs and to cause release of the brakes on the rear cars of the train is increased.

To overcome this difficulty, provision is made for supplying fluid from the brake pipe to the triple valve piston chambers and auxiliary reservoirs on the cars at the head end of the train for effecting release of the brakes and charging of the reservoirs, at a slower rate than the rate at which fluid is supplied to the triple valve piston chambers and the auxiliary reservoirs on the cars at the rear end of the train. When the brake valve device, not shown, is moved to release position, fluid under pressure is supplied from the main reservoir to the brake pipe, in the usual manner. Fluid under pressure is thus supplied to the piston chambers 48 on the cars at the head end of the train at a faster rate than fluid can flow through the ports 59 and 61 in the piston 49 to the accelerator chamber 51. Consequently the pressure of the fluid in said piston chamber builds up faster than the pressure builds up in the accelerator chamber 51 and when sufficient pressure differential has built up to overcome the tension of the spring 88, the accelerator piston 49 is moved to the right into sealing position wherein the sealing rib 62 engages the gasket 47 and closes communication from the brake pipe to the accelerator chamber 51 through port 62. With the piston 49 in sealing position, fluid under pressure can no longer flow from the piston chamber 48 to the accelerator chamber 51 through the passage 61, and thereafter the accelerator chamber 51 is charged at a slower rate through the restricted port 59 in the piston 49, thereby limiting the rate of flow of fluid from the brake pipe to the accelerator chambers on cars at the head end of the train. On cars at the rear end of the train, the brake pipe pressure is lower than on cars at the head end of the train and consequently insufficient pressure differential is built up on opposite sides of the pistons 49 to overcome the tension of the springs 88. The pistons 49 on the cars at the rear end of the train therefore remain in normal position, shown in the figure, and consequently fluid under pressure may flow to the accelerator chamber 51 on the rear cars of the train, through the ports 59 and 61. In this manner the auxiliary reservoirs at the head end of the train are supplied with fluid at a slower rate than would ordinarily be the case, thus conserving the fluid under pressure supplied to the brake pipe for delivery to the triple valve devices and auxiliary reservoirs on the cars at the rear end of the train, and effecting more uniform release of the brakes in a shorter time and more uniform charging of the auxiliary reservoirs. This feature of effecting a variable charging rate is claimed in the copending application of Ellery R. Fitch, Serial No. 644,265, filed November 25, 1932 and assigned to the assignee of this application.

It will be understood that fluid under pressure supplied to the accelerator chambers 51 on the cars at the head end of the train, from the brake pipe 6 through the port 59 in the quick service piston, flows through the pipe 92, to the triple valve piston chamber 12 at a rate to cause sufficient pressure differential on opposite sides of the triple valve pistons 14 to move them to normal release position shown in Fig. 1.

In the event of an overcharged brake pipe, such as might cause the pressure of the fluid within the accelerator chamber and the triple valve piston chamber 12 to exceed the pressure in the auxiliary reservoir and the valve chamber 15, the pressures on opposite faces of the piston 14 are caused to rapidly equalize through the pipe 93 past the ball check valve 94. This provision insures more consistent response of the triple valve piston to a brake pipe pressure reduction for effecting an application of the brakes closely following a release of the brakes, as a result of an increase in brake pipe pressure. The ball check valve 94 also prevents a reflux of fluid from the auxiliary reservoir and valve chamber 15 to the accelerator chamber 51. When the equipment is thus charged and the brakes are released, a reduction in brake pipe pressure will effect an application of the brakes in a manner to be hereinafter described.

Assuming the brake equipment to be in fully charged condition and the parts of the equipment to be in the release position shown in Fig. 1, in order to effect a service application of the brakes, the brake valve device, not shown, is moved to application position where it is held until the desired reduction in brake pipe pressure at a service rate has been effected. The reduction in brake pipe pressure at the head end of the train effects reduction of the pressure of the fluid in the piston chambers 48 of the accelerator valve devices on the cars at the head end of the train.

If the rate at which the pressure in chamber 48 is reduced exceeds the rate at which fluid can flow from chamber 51 through the ports 59 and 61, then the piston 49 will be shifted to the left by the higher pressure in chamber 51. The present device is so constructed that the piston will move as soon as a differential pressure of a quarter of a pound acts on the piston. As the piston 49 thus moves, the stem 91 unseats the valve 64 against the opposing pressure of the spring 71. When the valve 64 is thus unseated, fluid is vented from the piston chamber 48 to the quick service bulb 75 through port 69 in the piston 49 past the open valve 64, chamber 63 and restricted passage 76, the flow area of said restricted passage being such as to permit a rapid venting of fluid under pressure from the piston chamber 48 into the quick service bulb 75. Since the brake pipe is in communication with piston chamber 48 through the pipe and passage 52, the venting of piston chamber 48 causes a local venting of fluid from the brake pipe and this venting is effected serially on the cars of the train from front to rear.

With the accelerator piston 49 in its service position, as above described, and with the quick service valve 64 open so that fluid is vented from the quick service piston chamber 48 to the quick service bulb 75 in the manner above described, fluid under pressure flows from the accelerator chamber 51 to the piston chamber 48 through ports 59 and 61 in the piston 49. Movement of the quick service piston 49 to the left, also unseats the valve 81 and permits fluid under pressure to flow from the accelerator chamber to the atmosphere through passage 84 and the restricted passage 85. Fluid under pressure flowing to atmosphere through the restricted passage 85, and to the quick service bulb 75 through ports 59 and 61, piston chamber 48, past the valve 65, chamber 63 and restricted passage 76, causes reduction of the pressure in the accelerator chamber at a service rate and a corresponding reduction in the pressure in the triple valve piston chamber 12, which constitutes a part of the accelerator chamber volume. When the brake pipe pressure in the triple valve piston chamber 12 is reduced by the aforementioned local venting of brake pipe pressure sufficiently below the auxiliary reservoir pressure in the valve chamber 15, that the differential created on the piston 14 is great enough to overcome the resistance offered by the piston and main slide valve 17 in addition to the resistance of the graduating spring 25, the piston will move toward the left to full service position, carrying the slide valve 17 with it to service application position. With the triple valve piston 14 and main slide valve 17 in service application position, shown in Fig. 2, fluid under pressure flows from the auxiliary reservoir 7 to the brake cylinder 8 through pipe 99, valve chamber 15, service port 101 in the main slide valve 17, and passage and pipe 103. A service application of the brakes is therefore effected. As the main slide valve 17 is moved to service application position, the passage 97 is blanked by the main slide valve and consequently communication from the brake pipe to the triple valve chamber 15 through pipe 95, past the ball check valve 96, pipe 93 and dirt cleaner chamber 43 is cut off.

As the main slide valve 17 moves from release position toward service application position, communication from the accelerator chamber 51 to the triple valve chamber 15 through pipes 92 and 93, past the ball check valve 94, dirt collector chamber 43 and passage 97 is cut off.

The initial reduction in fluid pressure in the accelerator piston chamber 48 caused by opening of the valve 64 and the establishing of communication between the piston chamber 48 and the bulb 75 in the manner described, causes, as previously described, a local reduction in brake pipe pressure at the head cars of the train, which is transmitted to the quick service equipment on the succeeding cars, thereby serially propagating local quick service action throughout the train for rapidly effecting serial service application of the brakes on the cars throughout the length of the train.

At the conclusion of the brake pipe pressure reduction for effecting a service application of the brakes, the fluid pressures within the piston chamber 48 and the chamber 51 acting on opposite faces of the quick service piston 49 equalize through ports 59 and 61 in the piston 49, thereby permitting the spring 71 acting on the valve 64 to move the valve 64 to lap or closed position and also to move the accelerator piston 49 to the normal release position shown in Fig. 1.

When the desired reduction in brake pipe pressure has been effected and the brake valve device, not shown, is turned to lap position in the usual manner, the triple valve device operates to supply fluid from the auxiliary reservoir to the brake cylinder until the pressure in the auxiliary reservoir has been reduced to a degree slightly less than the reduced pressure in the accelerator chamber, at which time, the triple valve piston 14 is moved by the spring 25 so as to shift the graduating valve 18 to lap position.

With the main and graduating slide valves in lap position the service port 101 is lapped by the graduating valve and communication from the auxiliary reservoir to the brake cylinder is therefore closed so that no further fluid is supplied to the brake cylinder and fluid under pressure is retained therein in the well known manner.

With the quick service piston 49 in the normal position shown in Fig. 1, the valve 64 is closed and the fluid under pressure within the quick service bulb 75 flows to atmosphere at a rate as permitted by the restricted passage 77 so that the pressure in the quick service bulb 75 is reduced to provide for further reduction in brake pipe pressure when the accelerator piston opens the communication from the brake pipe to the bulb past the valve 64.

Should it be desired to increase the force with which the brakes are applied, a further reduction in brake pipe pressure is effected by moving the brake valve device, not shown, to service application position. In this event the operation of the accelerator piston and the triple valve piston as above described is repeated and may be repeated as desired. The flow capacity of the restricted port 77 may be such that the quick service bulb will not be completely vented between successive operations of the diaphragm 45. In this event the succeeding local reductions in brake pipe pressure will be less in degree than the initial local reduction, it being desirable to provide a slightly heavier initial reduction in order to compensate for the displacement of the brake cylinder piston.

In Patent 1,974,954 of Ellery R. Fitch and the applicant, assigned to the assignee of this application, a brake apparatus is disclosed for securing what is termed a "rippler quick service" in which the cars of the train are equipped with a quick service vent valve device which responds quickly to a light reduction in brake pipe pressure and the locomotive with means for effecting light successive reductions in brake pipe pressure, so long as the brake valve device is held in service application position. If the present construction is to be employed in connection with such apparatus, then the volume of the quick service bulb should be made small.

To effect release of the brakes, the brake valve device, not shown, is moved to release position wherein fluid is supplied from the main reservoir to the brake pipe, thereby so increasing the brake pipe pressure that the quick service pistons on the cars at the head end of the train, where the brake pipe pressure is high, are moved to sealing position in the manner previously described. When the pressure in the accelerator chamber 51 and the triple valve piston chamber 12 builds up and exceeds the auxiliary reservoir pressure in the valve chamber 15, the triple valve pistons 14 are moved to release position shown in Fig. 1.

In order to effect an emergency application of the brakes, the brake valve device, not shown, is moved to emergency position, wherein the brake pipe pressure is reduced at an emergency rate. Upon a reduction of brake pipe pressure at an emergency rate, the pressure of the fluid within the piston chamber 48 is reduced at an emergency rate, and the differential pressure thus created across piston 49 is so high as to cause piston 49 to move toward the left with sufficient force to overcome the tension of the spring 71 and unseat the quick service valve 64 and the vent valve 81 respectively. The sudden reduction in fluid pressure in the chamber 48 caused by the opening of the valve 64 and the venting of fluid from the chamber 48 to the quick service bulb, effects a relatively great local reduction in fluid pressure in the brake pipe in addition to the reduction in brake pipe pressure at an emergency rate effected by the venting of the brake pipe through the brake valve, not shown, at an emergency rate.

The local reduction in brake pipe pressure at an emergency rate also causes the higher accelerator chamber pressure acting on the ball check valve 54 to move it to open position against the action of the spring 55 and permit fluid to flow from the accelerator chamber 51 to the brake pipe through the passage 53 and restricted passage 56.

Fluid also flows from the accelerator chamber 51 through the ports 59 and 61 in the piston 49 and restricted passage 85 and the combined flow of fluid through ports 59 and 61, and passages 85 and 56 causes reduction of fluid pressure in the accelerator chamber 51 and the piston chamber 12 at an emergency rate. The higher auxiliary reservoir pressure acting on the right face of the piston 14 causes movement thereof to its extreme left or emergency position wherein fluid is supplied from the auxiliary reservoir 7 to the brake cylinder 8 through pipe 99, valve chamber 15, emergency port 104, and passage and pipe 103.

The local reduction of brake pipe pressure at an emergency rate at the head cars of the train effected by the discharge of fluid under pressure from the quick service piston chamber 48 to the bulb 75 past the open quick service valve 64, and to the atmosphere in the manner described, propagates throughout the length of the train, serial local reductions in brake pipe pressure at an emergency rate for effecting successive operations of the quick service pistons. After an emergency application of the brakes, the brakes may be released and the system recharged in the manner above described.

It is apparent from the foregoing that the improved control equipment for brake controlling valve devices such as the K-triple valve devices, effects more rapid serial application of the brakes throughout the length of the train than can ordinarily be obtained by use of the K-triple valve devices and that the brakes may be released and the brake system recharged with greater facility and more uniformly than has heretofore been possible with devices of the K-triple valve type.

In Figure 3, a modified form of triple valve construction is disclosed wherein the auxiliary reservoir 7 is charged, serially, through the accelerator chamber 51 from the brake pipe 6, and not directly from the brake pipe as in Figure 1. A passage 105, which was shown plugged in Figure 1, connects the dirt collector chamber 43 to the triple valve piston chamber 12, and the passage corresponding to passage 97 in Fig. 1, has no communication with the dirt collector chamber 43, as in Fig. 1. With the triple valve piston in release position, as shown in Figure 3, the auxiliary reservoir 7 is then charged with fluid under pressure from the accelerator chamber 51, through pipe 92, dirt collector chamber 43 passage 105, triple valve piston chamber 12, past the triple valve piston 14 through feed groove 106, triple valve chamber 15 and pipe 99.

A spring 107 is interposed between the piston 14 and a spring retainer 108 mounted in the bushing 109 for so positioning the triple valve piston 14 that slight initial movement of the piston 14 toward application position seals the feed groove 106 so that fluid under pressure cannot flow past the piston 14 from the valve chamber 15 to the triple valve piston chamber 12 when the piston 14 is in application position. The pressure within the valve chamber 15 and the piston chamber 12 may equalize through the feed groove 106 in the event that the accelerator chamber of the quick service valve device becomes overcharged as when the brake pipe at the head end of the train is overcharged.

In Fig. 5 a further modified form of triple valve device is disclosed wherein a passage 118 containing a ball check valve 119 serves to connect the triple valve piston chamber 12 with the valve chamber 15 so that fluid may flow from the piston chamber 12 to the valve chamber 15 in charging with the triple valve piston in release position. The pipe 92 leading from the accelerator chamber 51 of the accelerator valve device is connected to the dirt collector chamber 43 as in the device shown in Figure 3. Initial movement of the triple valve piston 14 toward application position closes the passage 118 and the ball check valve 119 prevents back flow of fluid from the valve chamber 15 to the triple valve piston chamber 12 under any circumstances. In the event that the accelerator chamber 51 becomes overcharged due to an overcharged brake pipe, the pressures within the valve chamber 15 and the piston chamber 12 will equalize past the ball check valve 119 and stabilize the piston so that it will respond quickly to an application shortly after the brakes have been released.

Except in the respects noted, the modifications shown in Figures 3 and 5 function as before described in connection with Figures 1 and 2.

Other fluid pressure brake equipments, operating on principles similar to those described herein, are shown and claimed in my Patent 1,976,876 and in my copending application Serial No. 677,438, patent and application being filed concurrently herewith on June 24, 1933, and assigned to the assignee of this application.

While but several embodiments of the invention are herein disclosed, it is obvious that additions, omissions and other changes may be made in the construction without departing from the spirit of the invention.

Having now described my invention, what I claim as new and desire to secure by Letters Patent, is:

1. In a fluid pressure brake, the combination with a brake pipe and a fluid pressure actuated brake controlling valve device, of an accelerator device comprising a chamber, a movable abutment subject on one side to brake pipe pressure and on the opposite side to the pressure of fluid in said chamber supplied from said brake pipe through a passage in said abutment, a valve operated by movement of said abutment upon a reduction in brake pipe pressure at a service rate for locally venting fluid from said brake pipe and also through said passage in said abutment from said chamber, and a second valve also operable by movement of said abutment upon a reduction in brake pipe pressure at a service rate for venting fluid from said chamber to the atmosphere, the combined effect of the venting of fluid from said chamber by the operation of said valves being to effect a reduction in the fluid pressure in said chamber at a service rate, such reduction in the pressure of the fluid in said chamber being effective to cause said brake controlling valve device to operate to effect an application of the brakes.

2. In a fluid pressure brake, in combination, a brake pipe, a reservoir, a chamber, an accelerator valve device operated upon a reduction in brake pipe pressure for effecting a reduction in the chamber pressure and for locally venting fluid under pressure from the brake pipe, a brake controlling valve device having an operating abutment subject on one side to reservoir pressure and on the other side to chamber pressure and being responsive to a reduction in chamber pressure to effect an application of the brakes, and means providing a communication controlled by the said brake valve device through which communication fluid under pressure is supplied from the brake pipe to charge the said reservoir, and check valve means for preventing back flow of fluid under pressure in the communication from said reservoir.

3. In a fluid pressure brake, in combination, a brake pipe, a reservoir, a chamber, an accelerator valve device operated upon a reduction in brake pipe pressure for effecting a reduction in the chamber pressure and for locally venting fluid under pressure from the brake pipe, a brake controlling valve device having an operating abutment subject on one side to reservoir pressure and on the other side to chamber pressure and being responsive to a reduction in chamber pressure to effect an application of the brakes, and means providing a communication controlled by the said brake valve device through which communication fluid under pressure is supplied directly from the brake pipe to charge the said reservoir, and check valve means for preventing back flow of fluid under pressure in the communication from said reservoir.

4. In a fluid pressure brake, in combination, a brake pipe, a reservoir, a chamber, an accelerator valve device operated upon a reduction in brake pipe pressure for effecting a reduction in the chamber pressure and for locally venting fluid under pressure from the brake pipe, a brake controlling valve device having an operating abutment subject on one side to reservoir pressure and on the other side to chamber pressure and being responsive to a reduction in chamber pressure to effect an application of the brakes, means providing a communication controlled by said brake valve device through which communication fluid under pressure is supplied directly from the brake pipe to charge the said reservoir, check valve means for preventing back flow of fluid under pressure in the communication from said reservoir, means providing a communication for permitting equalizing flow of fluid under pressure from the chamber to the reservoir, and check valve means for preventing back flow of fluid under pressure from the reservoir in the last said communication.

5. In a fluid pressure brake, in combination, a brake pipe, a reservoir, a chamber, a brake controlling valve device comprising valve means and an abutment subject on one side to reservoir pressure and on the other side to chamber pressure, said abutment being responsive to a reduction in chamber pressure for operating the valve means to effect an application of the brakes, means providing a communication controlled by said brake valve device through which communication fluid under pressure is supplied directly from the brake pipe to charge the reservoir, check valve means for preventing back flow of fluid under pressure in said communication, a movable abutment subject on one side to chamber pressure and on the other side to brake pipe pressure and having a passage therein through which fluid under pressure is supplied to charge the chamber from the brake pipe, and a valve operated by the said movable abutment for locally venting fluid under pressure from the brake pipe and causing a reduction in chamber pressure through the passage in the movable abutment, upon movement of the abutment in response to a reduction in brake pipe pressure.

6. In a fluid pressure brake, in combination, a brake pipe, a reservoir, a chamber, a brake controlling valve device comprising valve means and an abutment subject on one side to reservoir pressure and on the other side to chamber pressure, said abutment being responsive to a reduction in chamber pressure for operating the valve means to effect an application of the brakes, means providing a communication controlled by said brake valve device through which communication fluid under pressure is supplied directly from the brake pipe to charge the reservoir, check valve means for preventing back flow of fluid under pressure in said communication, a movable abutment subject on one side to chamber pressure and on the other side to brake pipe pressure, said last abutment controlling a communication through which fluid under pressure is supplied from the brake pipe to charge the chamber, and a pair of valves operated by the said last abutment upon movement of the abutment in response to a reduction in brake pipe pressure, one of said valves being effective to locally vent fluid under pressure from the brake pipe and the other being effective to vent fluid under pressure from the chamber to cause the said brake controlling valve device to effect an application of the brakes.

7. In a fluid pressure brake, in combination, a brake pipe, a reservoir, a chamber, a brake controlling valve device comprising valve means and an abutment subject on one side to reservoir pressure and on the other side to chamber pressure, said abutment being responsive to a reduction in chamber pressure for operating the valve means to effect an application of the brakes, a movable abutment subject on one side to chamber pressure and on the opposite side to brake pipe pressure, said last abutment having a passage therein through which fluid under pressure is supplied to charge the chamber with fluid under pressure from the brake pipe, a pair of valves operated by said last abutment upon movement of the abutment in response to a reduction in brake pipe pressure, one of said valves being effective to locally vent fluid under pressure from the brake pipe and from the chamber through the passage in the said last abutment, and the other valve being effective to vent fluid under pressure from the chamber to the atmosphere, the total reduction in chamber pressure being such as to cause the brake controlling valve device to effect an application of the brakes.

8. In a fluid pressure brake, the combination with a brake pipe and a fluid pressure actuated brake controlling valve device, of an accelerator device comprising a chamber, a movable abutment subject on one side to brake pipe pressure and on the opposite side to the pressure of fluid in said chamber supplied from said brake pipe through a passage in said abutment, a valve operated by movement of said abutment upon a reduction in brake pipe pressure at a service rate for locally venting fluid from said brake pipe and also through said passage in said abutment from said chamber, a second valve also operable by movement of said abutment upon a reduction in brake pipe pressure at a service rate for venting fluid from said chamber to the atmosphere, the combined effect of the venting of fluid from said chamber by the operation of said valves being to effect a reduction in the fluid pressure in said chamber at a service rate, and means, including means responsive only to a reduction in brake pipe pressure at an emergency rate, for additionally venting fluid under pressure from said chamber to increase the rate of reduction of chamber pressure to an emergency rate, said brake controlling valve device being responsive to reductions in chamber pressure at a service and an emergency rate to effect a service application and an emergency application of the brakes, respectively.

9. In a fluid pressure brake, in combination, a brake pipe, a reservoir, a chamber, an accelerator valve device operated upon a reduction in brake pipe pressure for effecting a reduction in the chamber pressure and for locally venting fluid under pressure from the brake pipe, a brake controlling valve device comprising valve means, an abutment subject on one side to reservoir pressure and on the other side to chamber pressure and being responsive to a reduction in chamber pressure for operating the valve means to effect an application of the brakes, a feed groove around the operating abutment of the brake controlling valve device through which fluid under pressure is supplied from the said chamber to charge the said reservoir, and yielding means effective to urge the said operating abutment to close the groove upon substantial equalization of the pressures in the chamber and the reservoir.

EARLE S. COOK.